United States Patent Office 3,179,272
Patented Apr. 20, 1965

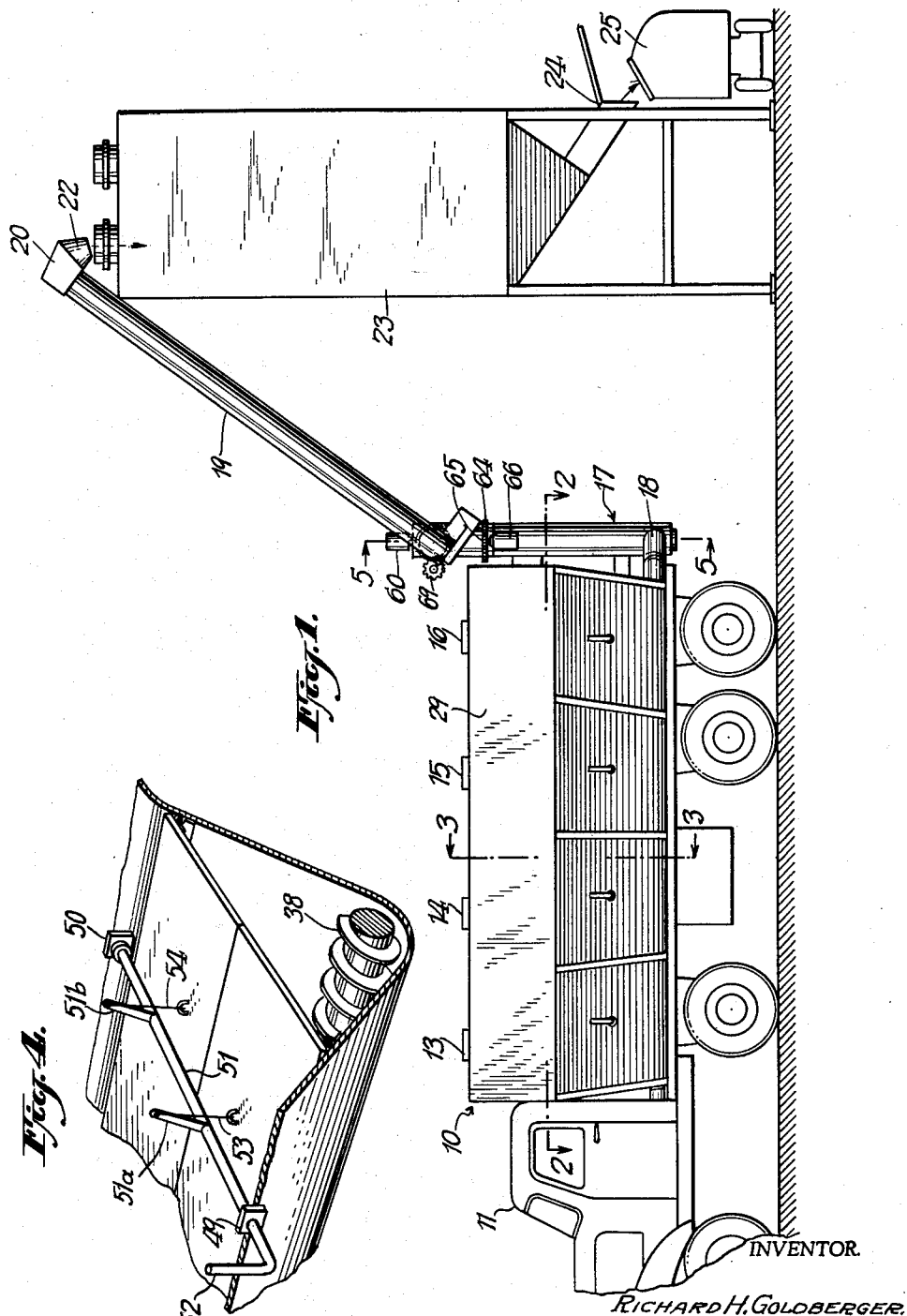

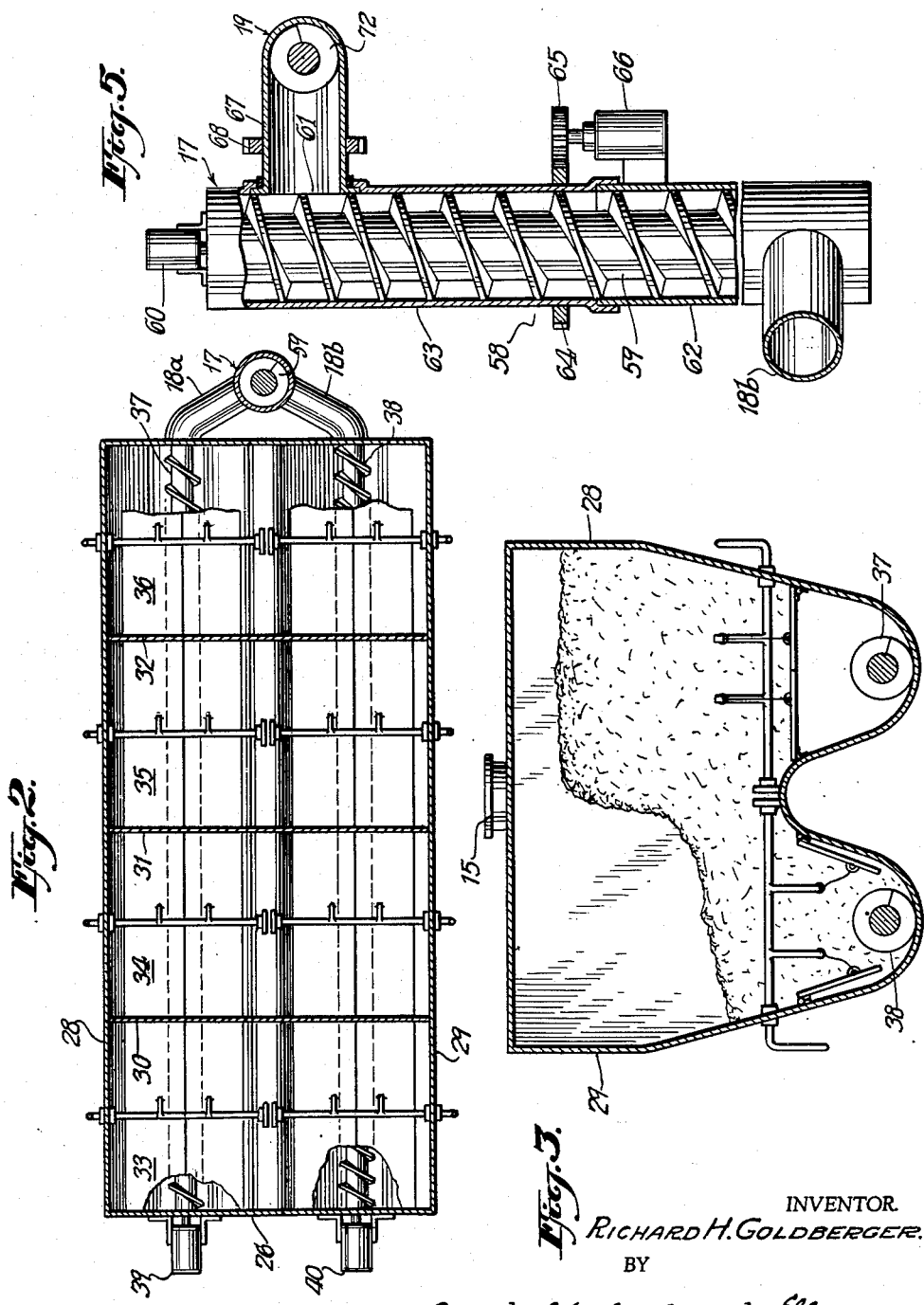

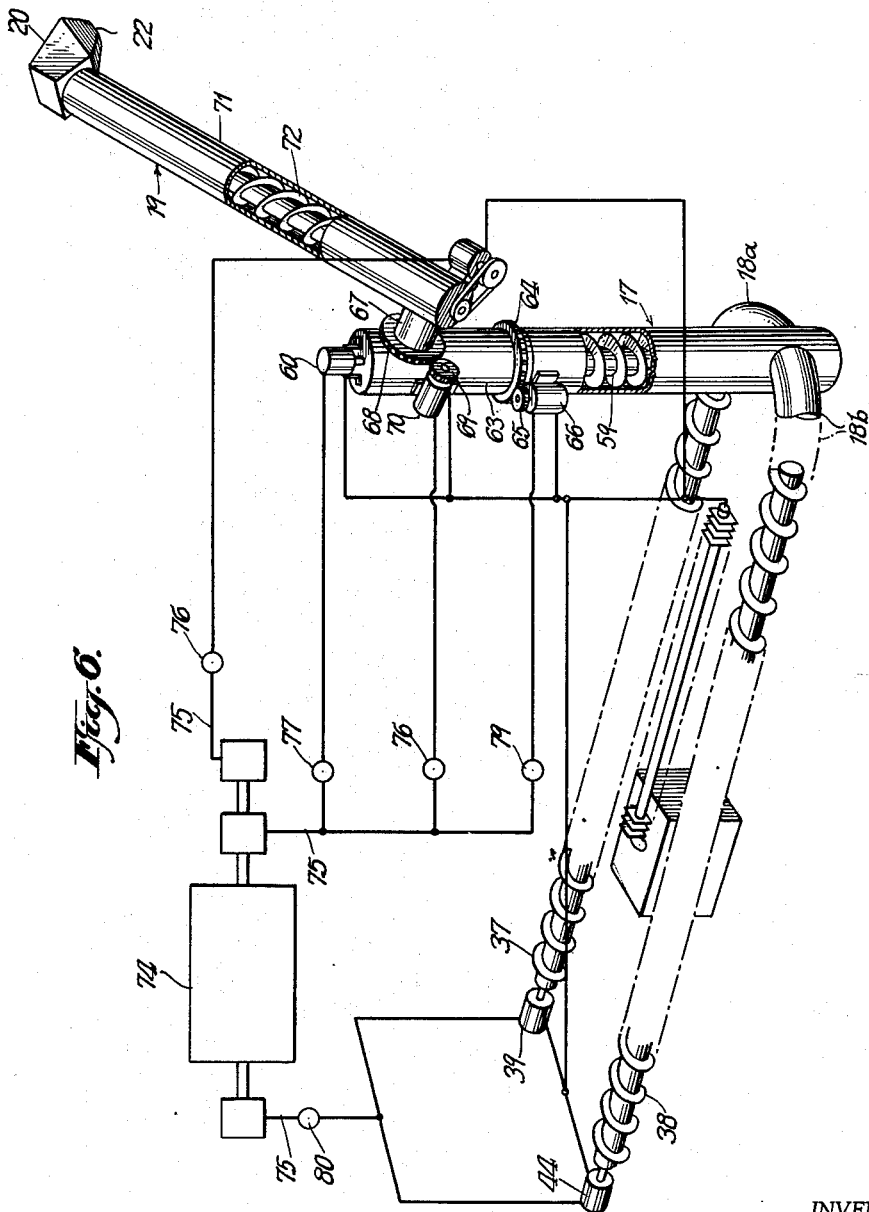

3,179,272
APPARATUS FOR TRANSPORTING AND DISPENSING FINELY DIVIDED SOLID MATERIALS
Richard H. Goldberger, 331-4 Academy Terrace, Linden, N.J.
Filed Mar. 26, 1963, Ser. No. 268,132
2 Claims. (Cl. 214—521)

This invention relates to apparatus for the transporting and dispensing of aggregate in its dry state for use in the manufacture of concrete, mortar and the like.

Dry mixed aggregates, which may be formed instantly into concrete or mortar simply by the addition of water thereto, have been known and used for some time. It has been difficult, however, to provide such dry mixes in large quantities because of the tendency for the various particles to segregate during pouring or in transportation. Consequently, the only commercially feasible use made of these dry mixes has been in non-industrial applications where small amounts are sold in prepackaged containers. Prior to the development of my System for Uniformly Mixing or Blending of Finely Subdivided Materials, which is described in U.S. patent application S.N. 110,906, filed on May 18, 1961, it had been necessary, in the case of large quantity industrial applications, to mix the various aggregate ingredients on location immediately prior to usage.

While the invention described in my copending application permits the premixing of dry aggregate ingredients, it had originally been necessary also to carry out this process on or near location for the reason that conventional commercial carriers could not be loaded or unloaded without inducing segregation of the mixed particles. This difficulty has since been overcome and its elimination is one of the features of the present invention.

Among the objects of my invention is the provision of a bulk transportation means suitable for the moving of dry aggregate ingredients in their mixed or unmixed state, and for the automatic and selective dispensing of such ingredients, with a minimum of particle segregation and loss. Other objects include the provision of such bulk transportation means which is further characterized by simplicity in construction and efficiency of operation and which is self-contained and self-powered.

Other objects will become apparent as the illustrative embodiment is described in greater detail.

In general these objects are carried out by means of a truck having a completely enclosed and specially shaped body portion which is divided into separate bins which in turn are individually openable into screw type conveyor channels which lie longitudinally along the underside of the truck body. These conveyor channels exhaust into further dispensing conveyors which are arranged to direct the exhausted material into a receiving bin or hopper at any given location.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized in a variety of ways for carrying out the several purposes of the invention. It is important, therefore, that the claims be regarded as including such equivalent ways as do not depart from the spirit and scope of the invention.

A specific embodiment of the invention has been chosen for purposes of illustration and description, and is shown in the accompanying drawings, forming a part of the specification wherein:

In the drawings:

FIG. 1 represents a truck embodying the principles of the present invention and shown situated for discharging its contents into a receiving hopper.

FIG. 2 is a section view taken along lines 2—2 of FIG. 1 showing in plan the interior of the van or body of the truck.

FIG. 3 is a section view taken along lines 3—3 of FIG. 1 and showing in end elevation the interior of the truck body.

FIG. 4 is a perspective view of a lower portion of the truck body illustrating the relationship of the trapped doors to the auger type conveyor.

FIG. 5 is a side elevation, partially in section, showing an outlet conduit connected to the rear portion of the truck body of FIG. 1.

FIG. 6 is a partial schematic illustrating a preferred hydraulic arrangement for driving the various conveyor and dispensing elements in the embodiment of FIG. 1.

Referring again to FIG. 1 a truck incorporating the principles of the present invention is seen generally as indicated at 10, and comprises a cab portion 11 and a body or van portion 12. The van portion is completely enclosed and is provided at the top thereof with a plurality of closeable hatches 13-16 through which the van 12 may be loaded. A vertically extending discharge conduit 17 is connected to the lower rear portion of the van 12 and communicates with the interior of the van by means of a connecting conduit 18. The discharge conduit 17 is connected, in a manner to be described more fully herein, to a movable dispensing conduit 19 which is arranged and constructed to be moved to any desired position for discharging material from within the truck out through a dispensing head 20. As shown in FIG. 1, the dispensing head 20 is shaped to conform to an inlet hatch 22 at the top of a temporary storage silo 23. The temporary storage silo 23 may be of very simple construction and is preferably provided with a hatch 24 near its bottom for discharging the dry mix into an agitator 25 where the mix is saturated with water to form mortar or concrete as the case may be.

Referring now to FIG. 2, it will be seen that the truck van 12 includes front and rear end walls, shown as 26 and 27 respectively, and a pair of side walls, 28 and 29. The interior of the van is divided by means of a plurality of transversely extending partitions 30-32 into individual bins 33-36. The partitions, it will be noted, are positioned approximately midway between the closeable hatches 13-16 so that each of the bins is provided with a corresponding hatch for separate loading thereof. In the illustrative embodiment there are provided two longitudinally extending auger type conveyors 37 and 38 which extend parallel to each other along the bottom of the truck van just under the transverse partitions 30-32. A pair of rotatable driving means 39 and 40, preferably hydraulic motors, are mounted at the front of the truck van and are connected to drive the respective auger conveyors in a direction such that material in contact with the conveyor is impelled toward the rear of the van.

The connecting conduit 18, leading from the rear of the truck van to the vertical discharge conduit 17, is seen to be made up of a pair of branches 18a and 18b which communicate with the interior of the van in the vicinity of the rear portion of each of the respective auger type conveyors.

Referring now to FIG. 3 the various individual bins are seen to be enclosed by means of a single continuous top wall 41 and by means of individual sets of closeable trap doors, designated respectively as 42 and 43. The trap doors in their normal or closed position, as shown in the right hand portion of FIG. 3, extend horizontally between the side wall and a point on a middle ridge 44 near the bottom of the respective bin. Pivotal mounting means 45, 46 are provided along the ridge and side walls respectively so as to permit the trap doors to open downwardly, as shown for example in the left hand side of FIG. 3, for dumping the contents of the bin into one of two grooves or channels 47 and 48, formed by the bottom of the truck body. These channels serve to house the auger conveyors and are generally of V or funnel shape in cross-sectional configuration. This serves to direct the flow of the aggregate material from the various bins down toward the center of the conveyor.

The means by which the trap doors are operated is most clearly shown in the fragmentary perspective view of FIG. 4. A control rod 51 extends horizontally between the center ridge 44 and one of the side walls 28 or 29 just above each set of trap doors, and is mounted in suitable bearing blocks 49 and 50 at each of these locations. Mutually parallel crank arms 51a and 51b extend perpendicularly from the control rod and are connected at their extended ends by means of corresponding cables 53 and 54 to suitable connecting points 55 and 56 near the free ends of the trap doors. When the control rod is rotated to bring the crank arms to a nearly vertical upward position, the trap doors are in their closed or horizontal position as shown. It is to be noted that in this position the cables are nearly in alignment with the crank arms and the downward pull of the trap doors under the influence of the load in the bin is incapable of generating significant torque to cause rotation of the rod and consequent opening of the doors. Furthermore, it will be noted, the consistency of the aggregate tends to retard any such movement of the crank arms. The control rod extends out through the side wall and is bent to form a handle 57 by which it may be manually controlled. If desired, automatic means may be arranged in any of several well known ways to achieve selective operation and dumping of the material from the various bins.

The vertically extending discharge conduit 17 is shown in detail in FIG. 5, and is seen to include a composite cylindrical outer shell 58 having mounted therein a further auger type conveyor 59. A driving means 60 such as a hydraulic motor is mounted on top of the conduit and is connected to turn the auger conveyor in a direction such that material entering through the connecting conduit 18 at the lower end is delivered upwardly toward a circular exhaust opening 61 near its upper portion.

The composite outer shell 58 is made up of a lower stationary portion 62 and an upper rotatable portion 63 which is rotatable upon, but remains aligned with, the lower portion 62. The upper rotatable portion is ringed by a gear element 64 which in turn engages with and is driven by a drive gear 65. The drive gear is mounted on a first stationary driving means 66 which may, for example, be a further hydraulic motor. By controlling the operation of the stationary driving means 66, the azimuthal position of the exhaust opening 61 may be varied at will.

The remainder of the dispensing system as well as its power supply and control means is best shown in the partial schematic view of FIG. 6.

As shown in FIG. 6, the two auger conveyors 37 and 38 are arranged to exhaust or discharge material into the two branches of the discharge conduit 17, which in turn empties into the lower portion of the vertical discharge conduit 17. The material is then elevated in the discharge conduit and expelled through the exhaust opening 61 into a cylindrical crossover conduit 67 which is rotatably mounted on the upper portion 63 of the vertical discharge conduit 17 in communication with the exhause opening 61. The crossover conduit is short and requires no internal auger to transmit the aggregate through it. It also is ringed by a gear element 68 which in turn is driven through a pinion 69 connected to a second stationary drive means 70 similar to the first stationary drive means 66 and mounted on the upper portion 63 of the vertical discharge conduit 17.

The dispensing conduit 19 includes an outer cylindrical shell 71 to which the crossover conduit is connected near one end. An auger conveyor 72 extends through the length of the shell 71 and is driven by means of an auger drive motor 73 mounted on the shell. Material enters into the dispensing conduit at its one end from the crossover conduit and is impelled by the auger conveyor 72 toward the dispensing head 20 which directs the material into the desired hatch or bin for storage or immediate usage.

It has been found convenient to utilize a central power supply system for operating the various auger and stationary drive motors. As shown in FIG. 6 an hydraulic pump 74 supplies fluid at high pressure over supply lines 75 and through individual control valves 76–78 to each motor. Exhaust fluid flows through drain lines 81 to a common sump or reservoir 82. By selective manipulation of the control vales, the speed at which material is dispensed can be closely controlled. Also, the hydraulic system permits smooth and accurate positioning of the discharge head 20.

The pump 74 may be driven from a power take-off attachment (not shown) on the truck or may be an inherent part of a central hydraulic system in the truck, in which case the high pressure and drain lines are merely connected to appropriate supply and drain points in the system.

It can be seen from the above description that any or several bins may be selectively and completely unloaded and the material therein dispensed accurately at any desired location. The completely enclosed system prevents loss of the more powdery constituents under windy conditions, and prevents caking and solidification under humid or rainy conditions. The auger conveyors prevent segregation and actually enhance mixing during the dispensing operation. Also the power requirements of the present arrangement are kept low inasmuch as the entire length of each of the augers need not be imbedded in the aggregate mixture at any one time.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. Apparatus for the transportation and dispensing of finely divided solid materials comprising a motor vehicle having mounted thereon a completely enclosed van divided by means of transversely extending partition elements into longitudinally separated bins, the lower portion of said enclosed van beneath said partition elements including at least one longitudinally extending channel having a generally V-shaped cross-section, and into which material from the various bins is directed by the sides thereof, auger type conveyor means extending longitudinally within each of said longitudinally extending channels and operable to drive material in contact therewith toward the rear of said van, a plurality of trap door means associated with each bin and mounted pivotally to open downwardly into said lower portion, each bin having an associated control rod extending transversely thereabove and provided with crank arms connected to the free ends of the trap doors within said bin, means interconnecting said crank arms to their associated trap doors to permit opening of the latter upon rotation of said control rods, said interconnecting means being of sufficient length to permit said crank arms to assume a generally vertical upward position when said trap doors are in a closed horizontal position, means external to said bin for rotating said control rods and an enclosed discharge system extending from the rear of said van in the vicinity of said auger type conveyor, said enclosed discharge system being provided with an exhaust nozzle and including auger type conveyors for moving material from within said van out through said exhaust nozzle.

2. Apparatus for the transportation and dispensing of finely divided solid materials comprising a motor vehicle having mounted thereon a completely enclosed van divided by means of transversely extending partition elements into longitudinally separated bins, the lower portion of said enclosed van beneath said partition elements including a pair of longitudinally extending channels forming a generally W-shaped cross-section, and into which material from the various bins is directed by the sides thereof, auger type conveyor means extending longitudinally within each of said longitudinally extending channels and operable to drive material in contact therewith toward the rear of said van, a plurality of trap door means associated with each bin and mounted pivotally to open downwardly into said channels, each bin having an associated control rod extending transversely thereabove and provided with crank arms connected to the free ends of the trap doors within said bin, means interconnecting said crank arms to their associated trap doors to permit opening of the latter upon rotation of said control rods, said interconnecting means being of sufficient length to permit said crank arms to assume a generally vertical upward position when said trap doors are in a closed horizontal position, means external to said bin for rotating said control rods and an enclosed discharge system extending from the rear of said van in the vicinity of said auger type conveyor, said enclosed discharge system comprising conduits leading from each auger type conveyor to a common vertical conduit provided with an internal auger and a further conduit and auger conveyor universally connected to the type of said vertical conduit and having a dispensing nozzle at the free end.

References Cited by the Examiner
UNITED STATES PATENTS

| | | | |
|---|---|---|---|
| 1,184,024 | 5/16 | Rohlfing | 105—300 |
| 2,589,988 | 3/52 | Bruno | 214—522 |
| 2,614,708 | 10/52 | Hoffstetter | 214—519 X |
| 2,633,255 | 3/53 | Hoffstetter | 214—521 X |
| 2,714,476 | 8/55 | Locke | 222—508 |
| 2,770,376 | 11/56 | Zinn | 214—83.32 |
| 2,960,320 | 11/60 | Heider | 214—522 X |
| 3,021,025 | 2/62 | Sudenga | 214—522 |
| 3,107,804 | 10/63 | Cox | 214—522 |

HUGO O. SCHULZ, *Primary Examiner.*